United States Patent
Seto et al.

(10) Patent No.: US 9,456,625 B2
(45) Date of Patent: Oct. 4, 2016

(54) INSTANT-PREPARED FRIED NOODLE AND PRODUCING METHOD OF THE NOODLE

(75) Inventors: Jiro Seto, Osaka (JP); Kenji Fujita, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1248 days.

(21) Appl. No.: 12/521,685

(22) PCT Filed: Dec. 28, 2007

(86) PCT No.: PCT/JP2007/075285
§ 371 (c)(1),
(2), (4) Date: Dec. 14, 2009

(87) PCT Pub. No.: WO2008/081931
PCT Pub. Date: Jul. 10, 2008

(65) Prior Publication Data
US 2010/0323070 A1    Dec. 23, 2010

(30) Foreign Application Priority Data
Dec. 29, 2006    (JP) .................. 2006-356709

(51) Int. Cl.
*A23L 1/16* (2006.01)
*A23L 1/162* (2006.01)
*A23L 1/01* (2006.01)

(52) U.S. Cl.
CPC .............. *A23L 1/162* (2013.01); *A23L 1/0107* (2013.01); *A23L 1/1613* (2013.01)

(58) Field of Classification Search
USPC ................................................ 426/557, 451
See application file for complete search history.

(56) References Cited

U.S. PATENT DOCUMENTS

| 4,469,711 | A | * | 9/1984 | Seltzer ........................ 426/557 |
| 5,332,592 | A | * | 7/1994 | Ishigaki et al. ............... 426/451 |
| 5,840,359 | A | * | 11/1998 | Lechthaler et al. ........... 426/516 |
| 5,916,619 | A | | 6/1999 | Miyazaki et al. |
| 6,497,910 | B2 | * | 12/2002 | Takahashi et al. ........... 426/438 |
| 2002/0001659 | A1 | | 1/2002 | Takahashi et al. |
| 2002/0009529 | A1 | | 1/2002 | Kamada et al. |
| 2003/0118711 | A1 | | 6/2003 | Kamada et al. |
| 2004/0105929 | A1 | | 6/2004 | Tomoda et al. |

FOREIGN PATENT DOCUMENTS

| EP | 1 085 822 B1 | 11/2003 |
| JP | 56-015657 | 2/1981 |
| JP | 58-175462 | 10/1983 |
| JP | 62-025946 | 2/1987 |
| JP | 04-278054 | 10/1992 |
| JP | 06-000064 | 1/1994 |
| JP | 08-140609 | 6/1996 |
| JP | 08-242793 | 9/1996 |
| JP | 8-242793 | 9/1996 |
| JP | 9-056350 | 3/1997 |
| JP | 11-192063 | 7/1999 |
| JP | 11-196799 | 7/1999 |
| JP | 2000-236821 | 9/2000 |
| JP | 2000-245377 | 9/2000 |
| JP | 2001-061425 | 3/2001 |
| JP | 2001-352924 | 12/2001 |
| JP | 2003-210118 | 7/2003 |
| JP | 2003-325154 | 11/2003 |
| JP | 2005-080583 | 3/2005 |
| JP | 2005-080584 | 3/2005 |
| JP | 2006-271274 | 10/2006 |
| RU | 2 095 998 C1 | 11/1997 |
| RU | 2 152 735 C2 | 7/2000 |
| WO | WO 00/48476 | 8/2000 |

OTHER PUBLICATIONS

Russian Office Action, w/ English translation thereof, issued in Russian Patent Application No. 2009129134/13(040487) dated Oct. 20, 2011.
English translation of Singaporean Office Action issued in Singaporean Patent Application No. 200904462-9, mailed Oct. 25, 2010.
Japan Self-Service Association, Shin Sokuseki Men Nyumon, new edition, Japan Food Journal Co., Ltd., Mar. 30, 1983, pp. 66-69 (in Japanese).

* cited by examiner

*Primary Examiner* — Lien T Tran
(74) *Attorney, Agent, or Firm* — McDermott Will & Emery LLP

(57) ABSTRACT

The present invention directed to instant-prepared fried noodle and aimed to reduce an amount of fats and oils therein and realize those with favorable texture and taste with the simple method without depending on any special device. Dough is prepared by adding 0.3-0.6 weight by percent in total of sodium carbonate and/or potassium carbonate to raw noodle flour like wheat flour, then adding edible acid substance thereto to adjust dough pH to 7.5-8.5, and kneading them with brine water. The dough so produced is rolled, cut, steamed, then seasoning solution or water is absorbed into noodle strings so made and the noodle strings are dried by frying them with oil of 130 ° C.-160° C. Thereby, an amount of fats and oils in the instant-prepared fried noodle bricks can be reduced without generating any scorching damage in the noodle strings.

10 Claims, No Drawings

INSTANT-PREPARED FRIED NOODLE AND PRODUCING METHOD OF THE NOODLE

RELATED APPLICATIONS

This application is the U.S. National Phase under 35 U.S.C. §371 of International Application No. PCT/JP2007/075285, filed on Dec. 28, 2007, which in turn claims the benefit of Japanese Application No. 2006-356709, filed on Dec. 29, 2006, the disclosures of which Applications are incorporated by reference herein.

DISCLOSURE OF THE INVENTION

Problems to be Solved by the Invention

The present invention provides a method for reducing amount of fats and oils in instant-prepared fried noodle with a technique which is different from the conventional method. The present invention aims to reduce an amount of fats and oils in instant-prepared fried noodle, especially, Chinese noodle with the simple method without depending on any special device, and to produce instant-prepared fried noodle with favorable texture and taste without scorching damage.

Means to Solve the Problems

Apart from the foregoing problems on the present invention, the present inventors studied on 'Effect on Browning of Noodle (Scorching Damage) by Brine Water in instant-prepared fried Chinese Noodle' and found unexpectedly therein present invention. Namely, due to the step of frying noodle strings at the temperature of about 150° C. for producing the instant-prepared fried noodle, pH of noodle strings can not be adjusted to higher range. Due to that, when pH of noodle strings is adjusted to the strong alkaline zone, the phenomenon that called scorching damage as result of the higher temperature at the frying step is occurred, thereby, the noodle strings are changed to brown color (Browning) and offer unacceptable scorching smell and acridity.

Under such conditions, in the commercially available instant-prepared fried noodle except for a part of products which are characterized in their baked color tone or their roasted flavor (e.g. deep-fried noodle like Nagasaki-Saraudon), an amount of brine water to be added was substantially limited to about 2-4 g (sodium carbonate and potassium carbonate in total amount of 1.5-2.5 g) based on 1 kg of raw flour like wheat flour. In contrast, in Chinese noodle that serves at noodle restaurant, about 10 g of brine water (almost all of this brine water consists sodium carbonate and potassium carbonate) per 1 kg of raw wheat flour was usually added, thereby, pH of noodle strings was adjusted to about 10. It is then realized, due to this difference, instant-prepared fried Chinese noodle could never match any flavor to be offered by Chinese noodle.

In view of this aspect, the present inventors conducted an experiment by adding to the raw noodle materials an excessive amount of brine water wherein such amount is not available in the usual instant-prepared fried noodle and further adding acid substances thereto to control pH and to prevent from forming scorching damage by frying the foregoing noodle as it is. It was then found that scorching damage could be prevented to a certain extend by adding acid substances. Simultaneously, it was also found that an amount of fats and oils in products was unexpectedly reduced, when brine water contained 0.3 weight by percent or more in total amount of sodium carbonate and/or potassium carbonate based on the raw noodle flour. Furthermore, instant-prepared fried noodle produced according to the present invention has improved flexibility and improved density in comparison with the conventional instant-prepared fried noodle. The present invention has been realized based on such knowledge and will be performed along with the following producing method.

Namely, the present invention directed to a method for producing instant-prepared fried noodle, the method comprises the steps of:

(A) preparing dough of pH 7.5-8.5 by kneading raw noodle flour, 0.3-0.6 weight by part in total amount of sodium carbonate and/or potassium carbonate based on 100 weight by part of the raw noodle flour, and edible acid substance, (B) producing raw noodle strings by extruding or rolling the dough and cutting them, (C) gelatinized the raw noodle strings by steaming process, (D) dipping noodle string in seasoning or water in order to transfer seasoning solution or water into the gelatinized noodle strings, and (E) the noodle strings that absorbed the seasoning solution or water fry at 130° C.-160° C.

According to the foregoing producing method, amount of fats and oils in instant-prepared fried noodles is reduced, then, it would receive no or little scorching damage. According to the foregoing producing method, the noodle produced has enhanced elasticity, improved solidity and less swellability with hot water in comparison with the conventional instant-prepared fried noodles. Then, when amount of fats and oils is reduced, since ratio on the other solid contents would be increased and density of noodle block would also be increased, reduction on breaking of such noodle block during transportation will also be expected. In addition, with regard to instant-prepared cup noodle (instant-prepared noodle contained by a cup), since the noodle block tend to sink in soup at the pouring hot water in comparison with the conventional instant-prepared noodles, it will cook the noodle and ingredients (spices) included smoothly.

On the other hand, according to the present invention, it indicates edible acid substance is preferably one or more of monosodium phosphate, monopotassium phosphate, acidity sodium pyrophosphate, organic acid, acidity thickening polysaccharides. These substances decrease pH and would not involve with safety of foods. In particular, a part of phosphate or organic acid is known as they act to prevent from deteriorating fats and oils. Among these, monosodium phosphate, monopotassium phosphate and acidity pyrophosphoric acid are substances which were permitted to use as one of the brine water. Then, the thickening polysaccharides are used to improve texture of instant-prepared noodle, and effects offered by such thickening polysaccharides would also be expected by adding these polysaccharides to the instant-prepared fried noodle.

Furthermore, according to the present invention, frying should be performed for about 120-240 seconds on the noodle, for example, instant-prepared noodle for vertical type cup noodle to be produced by the steps of frying noodle strings by frying it with oil of the temperature of 130-160° C. to dry; Thereby the noodle has a reducing water content to 5% or less, preferably 3% or less, and absorbing seasoning solution or water into the noodle (hereinafter referred to as 'seasoning step' and their treatment is then called as 'seasoning treatment') after gelatinization treatment that mentioned in step (D). Such frying time is terribly longer than that for the noodle to be produced without seasoning treatment and is a frying condition which easily generates scorching damage when an excessive amount of brine water is added.

Although the present invention directed to the instant-prepared fried noodle produced along with each of the foregoing methods, the final products of the present invention is the instant-prepared fried noodle which comprises 0.23-0.49 weight by percent in total amount of sodium carbonate and/or potassium carbonate based on weight of the instant-prepared noodle blocks and does not have any scorching damage.

EFFECTS OF THE INVENTION

According to a method for producing instant-prepared fried noodle of the present invention, by merely changing ratio of raw noodle material components, an amount of fats and oils in the produced noodle can be reduced without generating any scorching damage; While the noodle produced has improved flexibility and improved density. Then, with regards to the instant-prepared cup noodle, the noodle produced sinks in soup in comparison with the conventional products. Amount of fats and oils can be reduced in the actual measurements of from about 10% to about 20% in comparison with the conventional products (produced by adding 0.15-0.2 weight by percent of sodium carbonate based on the raw flour).

BEST MODE FOR CARRYING OUT THE INVENTION

The present invention will be described as follows according to the producing steps thereof.

According to the present invention, an excessive amount of sodium carbonate and/or potassium carbonate which would not usually be used in the instant-prepared fried noodle produced via the seasoning step and an acid substance for adjusting dough pH to the particular range are added to raw noodle material flour like wheat flour and they are kneaded.

Although sodium carbonate and potassium carbonate used in the present invention is usually used as main ingredients in brine water for Chinese noodle, they were added to the raw noodle material flour to be 0.3-0.6 weight by percent in total amount of a combination of sodium carbonate with potassium carbonate. Although 'brine water' according to Food Hygiene Law further comprises the other phosphate, polymeric phosphate and sodium bicarbonate, no or little effect for reducing an amount of fats and oils would be expected by these substances except for sodium carbonate and potassium carbonate. Accordingly, although the commercially available 'brine water' can also be employed in the present invention, when such brine water is used, sodium carbonate and potassium carbonate should be added to the brine water with an amount of 0.3-0.6 weight by part in total amount thereof based on weight of the raw flour (especially, some commercially available brine water for instant-prepared noodle contain relative large amount of phosphate and polymeric phosphate in the main component of sodium carbonate or potassium carbonate).

In the commercially available usual instant-prepared fried noodle, total amount of sodium carbonate and potassium carbonate to be added is generally from about 1.5 to about 2.5 g and up to 3 g or less per 1 kg of the raw flour except for some products characterized in their baked color tone and flavor. But water content prior to frying noodle strings in the fried noodle produced according to the present invention via the step of absorbing seasoning solution or water into noodle (seasoning step) after the step of steaming was larger with about 40 through about 50% than those produced without such seasoning step. Accordingly, since such frying step has to perform for the longer period, scorching damage may also be generated easily. In particular, when the instant-prepared fried noodle is vertical cupped noodle (instant-prepared cup noodle wherein the noodle is contained in vertical cup-form container), due to the foregoing seasoning step and larger bulk of their noodle bricks, the foregoing frying step has usually to perform for the longer period and scorching damage may also be generated easily. Therefore, with regard to such cupped noodle, total amount of sodium carbonate and potassium carbonate per 1 kg of raw flour should be adjusted 2 g or less and at most up to 2.5 g or less. Accordingly, an amount of 0.3-0.6 weight by percent per raw flour according to the present invention would not usually be employed in producing the fried noodle produced via the seasoning step. When such amount is employed, scorching damage is generated at the frying of the noodle strings, and product quality will then be lost.

When sodium carbonate is compared with potassium carbonate, sodium carbonate is a little superior to potassium carbonate in both to generate scorching damage by increasing pH and to realize the effect of the present invention (to reduce an amount of fats and oils). But such difference is not large, therefore, an amount of 0.3-0.6 weight by percent based on raw flour is employed when one of them or both of them are mixed together with the raw flour. Amount of 0.3% or less is not enough to offer the effect of the present invention, on the other hand, the amount of 0.6% or more needs large amount of acid substances which may change taste of the noodle and may generate scorching damage even if the large amount of the acid substances is employed to adjust dough pH to about 8.0.

Elements of 'edible acid substance' essentially used in the present invention together with sodium carbonate and potassium carbonate may include organic acid like lactic acid, acetic acid and citric acid; phosphate like monosodium phosphate, monopotassium phosphate, acid sodium pyrophosphate (disodium bipyrophosphate); or acid thickening polysaccharides like alginic acid, pectin; or the mixture of these. In particular, although any of monosodium phosphate, monopotassium phosphate and acid sodium pyrophosphate is acid substance, since they are regarded as 'brine water' under Food Hygiene Law, when such acid phosphate is solely added to such sodium carbonate and potassium carbonate as the acid substance according to the present invention, effect of the present invention come to be offered with simple addition of 'brine water', then concerned additives can be collectively identified as 'brine water' on the product package. Then, organic acid would realize soft texture on the noodle, on the other hand, addition of acid thickening polysaccharides would realize the function from each of thickening polysaccharides on the noodle.

Amount of such acid substance to be added is adjusted to that which changes pH of dough prior to produce noodle strings between 7.5 and 8.5. For example, when 3 g sodium carbonate is added to 1 kg wheat flour, dough pH is transferred to about 8.9 unless any other substance involved with such pH is added simultaneously. In order to adjust such dough pH to about 8.5 or less, addition of about 2 g monosodium phosphate or about 2.5 g of 50% lactic acid solution is necessary. When pH is 8.5 or more, scorching damage would easily be generated, then, in particular, when the amount of sodium carbonate or potassium carbonate is increased up to 6 g/kg, scorching damage would be generated if pH is lowered by increasing an amount of acid substances. On the other hand, when dough pH is transferred to 7.5 or less, according to the experiment results taken by the present inventors, reduction on an amount of fats and oils had not been confirmed. Substantial grounds on such results are unknown.

According to the present invention, it is necessary to add both such sodium carbonate and/or potassium carbonate and acid substances to noodle material flour at the kneading of raw materials. When noodle is produced by adding sodium carbonate and potassium carbonate to raw materials at the kneading thereof, preparing noodle strings from the kneaded materials, and subjecting such noodle strings to an acid treatment, for example, for the noodle strings by absorbing thereto, as an acid solution, seasoning solution and spray solution respectively to be employed after the gelatinization treatment, it is difficult to avoid scorching damage thereby even though pH of noodle strings is lowered. Accordingly, according to the present invention, both sodium carbonate and/or potassium carbonate and acid substances are added to noodle material flour at the kneading of raw materials. They may be added to raw material flour in the form of powder or liquid, otherwise, in the form of aqueous solution containing those. Then, the combination of the aqueous solution containing sodium carbonate alone with the powder containing the other components may also be used to add such components to noodle material flour. Namely, it is important to knead such materials to distribute uniformly and sufficiently such carbonate and acid substances as much as possible in the kneaded dough. In order to do so, it is preferable to add both components into aqueous solution, or to firstly prepare a pair of aqueous solution containing each of them and to add these solution respectively into raw noodle flour at the kneading thereof.

Raw noodle flour contains usually available wheat flour as a main ingredient and may further comprises various starch and buckwheat flour (these are collectively referred to as raw noodle flour in the present invention). When raw noodle flour contains acetylated starch, an amount of acid substances may be reduced because such acetylated starch is weak acid. At that time, in addition to these essential substances, polymeric phosphate, salt, various thickening agent, protein like gluten and pigment may also be added (polymeric phosphate is one of brine water, but it may be added in view of their chelating effect in addition to brine water). These additives may be added to raw noodle flour in the form of solid powder or aqueous solution containing them.

As stated above, noodle strings are produced by essentially adding sodium carbonate and/or potassium carbonate, acid substances and aqueous solution to raw noodle flour, further adding thereto the other necessary additives if any, kneading them well with a mixer, forming dough, and cutting or rolling the dough. In general, noodle strings are produced by preparing dough that was well kneaded with a mixer, preparing noodle sheet by rolling the dough, further rolling the dough gradually with a continuous roller, and cutting them with a cutter. The mixer employed herein may include the mixer used under normal pressure or under reduced pressure. Then, in order to produce hard noodle, vacuum roller is available at the producing of noodle sheet, otherwise, at least one intense rolling may be performed at the rolling of noodle sheet as taught by Patent Publication 8. In the meantime, an amount of fats and oils tends to be increased as noodle strings come to be thinner.

Noodle strings so produced are gelatinized by passing them through a steamer, then are subjected to seasoning treatment wherein seasoning solution are absorbed into noodle strings by immersing the noodle strings into seasoning solution or spraying seasoning solution to the noodle strings. Reasons to perform such seasoning treatment are not only to season the noodle strings, but also to soften the noodle strings to smoothly enter them into fry retainer, or to realize porous noodle strings to be formed by frying noodle strings having increased water content to instantly cook such fried noodle by merely pouring hot water thereinto. Accordingly, in view of these aspects, when the instant-prepared fried noodle is an instant-prepared cup noodle, such seasoning treatment is usually employed. As the seasoning solution to be absorbed into noodle strings at the seasoning treatment, in general, solution prepared by dissolving salt alone or a mixture of the salt and some seasonings is often used, but the other substances may also be used. Then, when it is not necessary to season the noodle strings at the seasoning treatment, any solution except for water (comprising warm water and hot water; hereinafter simply referred to as 'water') should not be absorbed at the seasoning step. Therefore, the seasoning treatment according to the present invention comprises immersion of the noodle strings into water and spray of water to the noodle strings. Water content of the noodle strings produced through gelatinization thereof with steaming procedure is usually at most about 30-40%, but water content of the noodle strings produced through seasoning treatment is changed thereby to about 40-60%.

As stated previously, the fried noodle is produced by absorbing seasoning solution or water into noodle strings, putting the noodle strings for single meal into the retainer, and frying the same. If the frying treatment is performed at the higher temperature, color of the noodle changes to brown due to scorching damage and smooth noodle surface is lost. On the other hand, when the frying treatment is performed at the lower temperature, the noodle strings can not be fried enough, in particular, core portion of the noodle bricks can not be dried completely, thereby, longer shelf life on such noodle bricks can not be expected. Accordingly, the frying treatment is performed at about 130° C.-about 160° C., usually at the relatively limited temperature range of about 140° C.-about 150° C. According to the experiments conducted by the present inventors, scorching damage due to the frying treatment was often generated at the higher frying temperature. On the other hand, an amount of fats and oils was slightly reduced when the frying treatment was performed to keep an appropriate water content in the product and to lower the frying temperature to the minimum temperature of about 130° C. There was no substantial difference on an amount of fats and oils due to difference of the frying treatment within the foregoing temperature range (130° C.-160° C.).

In consideration of shelf life and cost, palm oil is preferable as oil for frying noodle strings, but the other vegetable oil or animal oil like chili oil, or the mixture of these may also be used. With regard to time to fry noodle strings, although it depends on cross sectional area of the noodle strings and shape of the subjected noodle bricks, about 120-240 seconds are necessary for general instant-prepared cup noodle produced via seasoning step at the foregoing frying temperature. Especially, the noodle produced by cutting noodle dough having 1.0 mm thickness with $18^{th}$ circular cutter and via seasoning step on about 100 g noodle put into vertical cup prior to frying step is usually fried at about 140° C. for 180 seconds or 150° C. for 150 seconds, thereby, water content thereof after such frying step is reduced to 5% or less, preferably to about 1-3%.

Instant-prepared fried noodle so produced is then handled by removing noodle bricks from retainers, cooling them, enter them into cup-form container for cupped noodle, adding necessary ingredients and dried soup to the container, and then the product so made is cooked by merely pouring hot water onto the noodle. For packaged noodle, noodle brick is packed into a bag and necessary ingredients and dried soup are also packed thereinto, and then the product so made is cooked by pouring hot water onto the noodle or boiling it. Then the products produced according to the present invention is the instant-prepared fried noodle in their final product which comprises 0.23-0.49 weight by percent as calculated value in total amount of sodium carbonate and/or potassium carbonate based on weight of the instant-prepared noodle bricks and does not have any scorching damage. An amount of fats and oils can be reduced in the actual measurements of from about 10% to about 20% in comparison with the conventional products (an instant-prepared cup noodle produced by adding 0.15 weight by percent of sodium carbonate based on the raw flour and employing the successive similar steps).

EXAMPLES

The present invention is described in detail as follows with regard to the best mode for carrying out the invention with reference to the experiments, but the present invention should not be limited based on the following experiment results. In the meantime, the following experiments determined presence of reduction effect on an amount of fats and oils, when about 10% or more of an amount of fats and oils has been reduced in comparison with the control product which contains 0.15% (w/w) of sodium carbonate based on raw noodle flour and have produced via the seasoning step (a step to absorb seasoning solution or water to noodle strings after steaming step) according to the conventional product. An amount of fats and oils has been determined according to the standard assay methodology on fats and oils arranged by Japan Oil Chemists' Society. Dough pH and noodle pH have been determined by 10-fold diluting the samples with distilled water, grinding them into paste form with a mill for one minute, leaving them for three minutes, and determining pH with a single electrode equipped with pH meter while agitating them with a stirrer.

In the meantime, with regard to each sample in the following Experiment, Example products according to the present invention are identified with '*' at Sample Number in Tables 1-6.

[Experiment 1] (Effect on an Amount of Fats and Oils and Scorching Damage when an Amount of Sodium Carbonate is Changed and pH is Adjusted with Monosodium Phosphate.)

350 ml aqueous solution containing 20 g salt, the predetermined amount of sodium carbonate and monosodium phosphate (acid substance) which allows to adjust dough pH to about 8 was added to 1 kg raw noodle flour consisting of 850 g wheat flour and 150 g acetylated tapioca starch, then they were mixed together well with a mixer for 15 minutes, then were left for about 15 minutes, and dough pH at that moment was determined. Dough so produced was entered into a continuous roller to roll them into noodle sheet having 1.00 mm thickness, then such noodle sheet was cut with a $20^{th}$ square cutter into noodle strings. Such noodle strings were gelatinized by steaming for two minutes in the normal steam (temperature in steam chamber was 99° C.) of 600 kg/m$^3$/hr, then the cooled noodle strings were immersed into 60 g/L salt solution (seasoning solution) for ten seconds (seasoning treatment), and were cut into for every meal. These noodle strings, namely, 105 g for every meal were put into a cylindrical fry retainer having 65 mm diameter and about 300 cm$^3$ volumes. The fry retainer was closed with a lid, then the noodle strings were dried by frying about 160 seconds them in palm oil of 145° C. which adjust water content thereof to about 3% after this frying step, and noodle bricks were removed from the fry retainer by reversing the fry retainer immediately after such frying step. Then the top surface (upper surface at the frying step) of the noodle was put onto paper towel and noodle bricks were cooled for producing fried noodles. Water content and an amount of fats and oils on these noodle bricks were determined with N=4 to know the average value thereof. Then baked noodle bricks were confirmed visually. Results are shown in Table 1.

TABLE 1

| Sample No. | Amount of sodium carbonate (g) | Amount of monosodium phosphate (g) | Dough pH | Content of Fats and Oils (%) | Color Tone of Noodle Bricks |
|---|---|---|---|---|---|
| 1 | 1.5 | 0 | 7.98 | 17.4 | Excellent |
| 2 | 2.0 | 1.17 | 8.07 | 16.5 | Excellent |
| 3 | 2.5 | 2.23 | 8.00 | 16.4 | Excellent |
| 4* | 3.0 | 3.50 | 8.00 | 15.4 | Excellent |
| 5* | 6.0 | 10.5 | 8.04 | 14.3 | Slightly colored but acceptable |

As shown in Table 1, when the experiment was conducted by changing an amount of sodium carbonate to be added, there was no substantial change on an amount of fats and oils of Samples 1-3 wherein 2.5 g/kg or less of sodium carbonate was added thereto. On the other hand, an amount of fats and oils was reduced in Sample 4 wherein 3 g/kg of sodium carbonate was added thereto, namely, about 11% of an amount of fats and oils was reduced in comparison with Sample 1 (the conventional product) wherein 1.5 g/kg of sodium carbonate was added thereto. Then when 3 g/kg of sodium carbonate was used, 18% of an amount of fats and oils was reduced. When up to 6 g/kg of sodium carbonate was used, scorching damage was slightly generated even if pH was adjusted to 8.0. Accordingly, the maximum amount of sodium carbonate to be added seems to 6 g/kg.

[Experiment 2] (Effect on an Amount of Fats and Oils when Dough pH is Lowered with Monosodium Phosphate.)

When an amount of sodium carbonate is 4 g/kg and pH is changed by further changing an amount of monosodium phosphate as an acid substance according to the procedure referred to in EXPERIMENT 1, effect on an amount of fats and oils and scorching damage in noodle bricks has been examined along with the procedure which is similar to those referred to in EXPERIMENT 1. Results are shown in Table 2.

TABLE 2

| Sample No. | Amount of sodium carbonate (g) | Amount of monosodium phosphate (g) | Dough pH | Content of Fats and Oils (%) | Color Tone of Noodle Bricks |
|---|---|---|---|---|---|
| 1 | 1.5 | 0 | 8.05 | 17.4 | Excellent |
| 6 | 4.0 | 0 | 9.37 | 13.9 | Remarkable scorching damage and scorching smell |
| 7* | 4.0 | 5.5 | 8.04 | 14.1 | Excellent |
| 8* | 4.0 | 7.0 | 7.67 | 15.1 | Excellent |
| 9* | 4.0 | 7.5 | 7.60 | 15.6 | Excellent |
| 10 | 4.0 | 8.0 | 7.46 | 15.9 | Excellent |
| 11 | 4.0 | 10.0 | 7.17 | 17.1 | Excellent |

In contrast to Sample 1 of the conventional product, Sample 6 contained 4 g/kg of sodium carbonate and offered reduction on an amount of fats and oils, but it had remarkable scorching damage and could not be eaten. In contrast thereto, about 10% of an amount of fats and oils was reduced in Samples 7, 8 and 9 wherein dough pH was lowered with monosodium phosphate, but 9% of an amount of fats and oils was reduced in Sample 10 wherein dough pH was adjusted to about 7.5. On the other hand, an amount of fats and oils was not reduced in Sample 11 wherein dough pH was adjusted to 7.2. Accordingly, it was clarified that excessively lowered dough ph could not reduce an amount of fats and oils. Minimum pH which can expect the effect according to the present invention was judged as about 7.5.

[Experiment 3] (Effect on an Amount of Fats and Oils when Dough pH is Elevated with Monosodium Phosphate.)

When an amount of sodium carbonate is 3 g/kg and pH is changed by further changing an amount of monosodium phosphate as an acid substance according to the procedure referred to in EXPERIMENT 1, effect on an amount of fats and oils and color tone in noodle bricks has been examined along with the procedure which is similar to those referred to in EXPERIMENT 1. According to this experiment, pH of noodle bricks has also been determined. Results are shown in Table 3.

TABLE 3

| Sample No. | Amount of sodium carbonate (g) | Amount of monosodium phosphate (g) | Dough pH | Content of Fats and Oils (%) | Noodle Brick pH | Color Tone of Noodle Bricks |
|---|---|---|---|---|---|---|
| 1 | 1.5 | 0 | 8.05 | 17.4 | 7.13 | Excellent |
| 12 | 3.0 | 0 | 8.95 | 12.9 | 7.64 | Remarkable scorching damage |
| 13 | 3.0 | 1.0 | 8.71 | 14.0 | 7.58 | Slight scorching damage |
| 14* | 3.0 | 2.0 | 8.43 | 14.5 | 7.40 | Excellent |
| 15* | 3.0 | 3.0 | 8.31 | 15.3 | 7.32 | Excellent |
| 16* | 3.0 | 3.5 | 8.08 | 15.2 | 7.25 | Excellent |

When 3 g/kg sodium carbonate and various amount of monosodium phosphate were added to aqueous solution and dough pH was changed, Sample 12 without monosodium phosphate indicated dough pH of about 9 and had severe scorching damage, but a little scorching damage had merely been found at dough pH of 8.7 in Sample 13 containing 1 g/kg monosodium phosphate. On the other hand, reduction of amount of fats and oils had been confirmed without any scorching damage in Samples 14, 15 and 16 wherein dough pH was further lowered with monosodium phosphate. Accordingly, it was judged that dough pH should be adjusted to 8.5 or less. In the meantime, as pH of noodle bricks for product, dough pH should preferably be adjusted to 7.5 or less.

[Experiment 4] (Effect on Substitution of Monosodium Phosphate with the Other Acid Substances, then that on Substitution of Sodium Carbonate with the Other Brine Water, and that on Use of Polymeric Phosphate)

Effects were examined when an amount of sodium carbonate was 3 g/kg and acid substances except for sodium carbonate were used as indicated in the following Table 4 according to the procedure referred to in EXPERIMENT 1, otherwise the other brine water components (potassium carbonate mixture of sodium carbonate and potassium, tribasic sodium phosphate, sodium bicarbonate) were used instead of sodium carbonate, or calcined calcium was used as brine water substitute, otherwise, polymeric phosphate was added. Results are shown in Table 5.

TABLE 4

| Sample No. | Alkaline agent | Amount (g) | Acid substance | Amount (g) | Polymer phosphate | Amount (g) |
|---|---|---|---|---|---|---|
| 1 | sodium carbonate | 1.5 | | | | |
| 17* | sodium carbonate | 3.0 | 50% lactic acid | 2.6 | | |
| 18* | sodium carbonate | 3.0 | 50% lactic acid | 4.0 | | |
| 19* | sodium carbonate | 3.0 | 50% lactic acid | 4.5 | | |
| 20* | sodium carbonate | 3.0 | pectin | 15.0 | | |
| 21 | trisodium phosphate | 5.0 | Monosodium phosphate | 1.0 | | |
| 22 | trisodium phosphate | 5.0 | Monosodium phosphate | 2.0 | | |
| 23 | sodium bicarbonate | 3.5 | Monosodium phosphate | 3.0 | | |
| 24 | calcined calcium | 1.2 | Monosodium phosphate | 2.0 | | |
| 25* | pottasium carbonate | 4.0 | Monosodium phosphate | 3.8 | | |
| 26 | sodium carbonate + pottasium carbonate | 1.5 + 1.5 | | | | |
| 27* | sodium carbonate + pottasium carbonate | 1.5 + 1.5 | Monosodium phosphate | 2.5 | | |
| 28 | sodium carbonate + pottasium carbonate | 1.5 + 1.5 | | | sodium polyphosphate | 2.0 |
| 29 | sodium carbonate + pottasium carbonate | 1.5 + 1.5 | | | sodium metaphosphate | 2.0 |

TABLE 5

| Sample No. | Dough pH | Amount of fats and oils (%) | Color tone of Noodle Bricks |
|---|---|---|---|
| 1 | 8.08 | 17.4 | Excellent |
| 17* | 8.40 | 14.7 | Excellent |
| 18* | 8.02 | 14.1 | Excellent |
| 19* | 7.97 | 14.5 | Excellent |
| 20* | 8.00 | 13.9 | Excellent |
| 21 | 8.33 | 17.7 | Excellent |
| 22 | 7.50 | 17.1 | Excellent |
| 23 | 7.98 | 17.5 | Excellent |
| 24 | 8.11 | 19.5 | Excellent |
| 25* | 8.08 | 16.0 | Excellent |
| 26 | 8.84 | 13.9 | scorching damage |
| 27* | 8.15 | 15.2 | Excellent |
| 28 | 8.60 | 15.2 | remarkable scorching damage |
| 29 | 8.33 | 14.6 | scorching damage (be worse than sample No. 26) |

As shown in Table 5, in contrast to the conventional product of Sample 1, apparently from Samples 17-20 wherein an amount of sodium carbonate based on 1 kg raw noodle flour was adjusted to 3 g or 4 g, an amount of fats and oils could be reduced without generating scorching damage with lactic acid that is one of organic acid and pectin that belonged to acid thickening polysaccharides. Then, an amount of fats and oils could also be reduced by substituting sodium carbonate with potassium carbonate or employing a mixture of sodium carbonate and potassium carbonate. On the other hand, when polymeric phosphate was used instead of acid substances, although dough pH was lowered a little due to buffer function by the polymeric phosphate, scorching damage could not be avoided or was enhanced in some cases.

Further, the reduced amount on fats and oils according to Samples 21-23, wherein tribasic sodium phosphate or sodium bicarbonate respectively of both alkaline substance and one of brine water was used instead of sodium carbonate, was less than that according to the conventional product of Sample 1. On the contrary, Sample 24 wherein the calcined calcium was used as brine water substitute had increased an amount of fats and oils. These results indicated clearly that sodium carbonate and potassium carbonate are necessary to heighten dough pH and to realize the effects of the present invention, on the other hand, such dough pH could be lowered by organic acids and acid thickening polysaccharides in addition to acid phosphate like monosodium phosphate.

[Experiment 5] (Effect on pH Adjustment with Acid Immersion of Noodle Strings)

Amount of fats and oils and scorching damage had been examined along with the procedure which is similar to that referred to in EXPERIMENT 1 on the noodle bricks produced by preparing noodle strings with 4 g/kg sodium carbonate (dough pH at that time was 9.24) without any acid substance like monosodium phosphate according to the procedure of EXPERIMENT 1 and steaming them, immersing the steamed noodle strings into acid solution containing, per 1 L seasoning solution, lactic acid or monosodium phosphate with an amount indicated in Table 6, and adjusting their pH (the comparative control of Sample 30 was produced via immersion into seasoning solution according to EXPERIMENT 1). According to this experiment, noodle strings pH had also been determined after acid solution immersion. Sine some products have acid smell, their noodle flavor had also been examined by five skilled persons. Results are shown in Table 6.

TABLE 6

| | Amount of solution for acid immersion (g/L) | | pH after acid immersion | Content of Fats and Oils (%) | Color Tone of Noodle Bricks | Flavor of Noodle |
|---|---|---|---|---|---|---|
| Sample No. | 50% lactic acid | Monosodium phosphate | | | | |
| 30 | | | 9.37 | 13.9 | Remarkable scorching damage | Scorching smell |
| 31 | 8.5 | | 7.92 | 12.6 | Remarkable scorching damage | Weak acid smell |
| 32 | 10.0 | | 7.50 | 13.2 | Remarkable scorching damage | Strong acid smell |
| 33 | | 5.0 | 8.07 | 12.2 | Remarkable scorching damage | Weak acid smell |
| 34 | | 6.0 | 7.59 | 12.7 | Remarkable scorching damage | Weak acid smell |

As shown in Table 6, although reduction of an amount of fats and oils had been confirmed in any of Sample, their product value had been lost due to scorching damage generated regardless of pH adjustment to about 8 or less. Similar results were taken according to the immersion by either acid of lactic acid and monosodium phosphate.

Example 1

350 ml aqueous solution was added to 1 kg raw noodle flour consisting of 830 g wheat flour and 170 g acetylated tapioca starch, then they were mixed together well with a mixer for 15 minutes. The aqueous solution of 350 ml was prepared by dissolving 20 g salt, polymeric phosphate 3.0 g (Polymerized phosphate consists of sodium polyphosphate 2 g+sodium pyrophosphate 1 g. Polymerized phosphate is one of the brine water, but it was used as chelating agent expected for their chelating function. Apparent from the foregoing EXPERIMENTS, an amount of fats and oils could not be reduced by polymeric phosphate.), mixed brine water 5.5 g (consisting of sodium carbonate 1.2 g+potassium carbonate 1.8 g+monosodium phosphate 1.5 g+tribasic sodium phosphate 1.0 g) and alginic acid 1.0 g into water. pH of the aqueous solution was 10.2. Kneaded dough were left for about 15 minutes and dough pH at that moment was determined as 7.89.

Dough so produced was entered into a continuous roller to roll them into noodle sheet having 1.00 mm final thickness, then such noodle sheet was cut with a $18^{th}$ square cutter into raw noodle strings. Such raw noodle strings were gelatinized by steaming for two minutes in the normal steam (temperature in steam chamber was 99° C.) of 600 kg/m³/hr, then, as the seasoning treatment, the cooled noodle strings were immersed into 60 g/L salt solution for ten seconds, and were cut into for every meal. These noodle strings, namely, 105 g for every meal were put into an approximate cylindrical fry retainer having 65 mm diameter and about 300 cm³ volumes. The fry retainer was closed with a lid, then the noodle strings were dried by frying about 160 seconds them in palm oil of 145° C. which adjust water content thereof to about 3% after this frying step. Noodle bricks were removed from the fry retainer by reversing the fry retainer immediately after such frying step. Then the top surface of the noodle was put onto paper towel and noodle bricks were cooled for producing fried noodles. When an amount of fats and oils on these noodle bricks were determined with N=4 to know the average value thereof, the value was 14.6% and they were excellent bricks without any scorching damage.

Instant-prepared cup noodle (instant-prepared noodle incorporated into a cup) was produced by putting the foregoing noodle bricks into cup-form waterproofing paper container having diameter at upper opening of about 8.5 cm and at bottom of about 6 cm and height of about 10 cm, then adding thereto dried ingredients (spices) and dried soup, and heat-sealing the upper opening of the paper container with a paper lid. For eating it, the lid was peeled from the upper opening of the paper container, then about 300 ml hot water was then poured into the container and the container was left for three minutes as they are by closing the container with the lid, and the contents were stirred thereafter. Instant-prepared noodle so cooked had noodle strings which offered good taste, had no scorching damage, had cooked uniformly with hot water, and had improved flexibility and improved density.

INDUSTRIAL APPLICABILITY

The present invention is useful for producing instant-prepared fried noodle, especially, for producing instant-prepared cup noodle, but it is also useful for producing instant-prepared packaged noodle. Then, the instant-prepared fried noodle according to the present invention is appropriately applied to Chinese noodle.

The invention claimed is:

1. A method for producing instant-prepared fried noodles, the method comprising steps of:
    (A) preparing dough by kneading raw noodle flour, 0.3-0.6 weight by part of sodium carbonate and/or potassium carbonate based on 100 weight by part of the raw noodle flour and edible acid substance, pH of the dough being set to 7.5-8.5;
    (B) producing raw noodle strings by extruding or rolling the dough and cutting the extruded or rolled dough;
    (C) gelatinizing the raw noodle strings by a steaming process;
    (D) dipping the gelatinized noodle strings in a seasoning solution or water in order to transfer the seasoning solution or water into the gelatinized noodle strings; and
    (E) frying the noodle strings that absorbed the seasoning solution or water at 130° C.-160° C.,
    wherein in the step (A), the sodium carbonate and/or potassium carbonate are added to the raw noodle flour in a form of an aqueous solution, and the aqueous solution further contains the edible acid substance.

2. The method according to claim 1, wherein said edible acid substance in step (A) is one or more of monosodium phosphate, monopotassium phosphate, sodium pyrophosphate, organic acid, polysaccharide thickening agent.

3. The method according to claim 1, wherein said noodle strings in step (E) are fried in oil of 130° C.-160° C. for 120-240 seconds so that water content in the noodle strings is reduced to 5% or less.

4. Instant-prepared cup noodles, comprising:
    a container; and
    the instant-prepared fried noodles produced according to claim 1 and contained in the container.

5. Instant-prepared fried noodles produced through the step of transferring seasoning solution or water to steamed noodle strings,
    wherein the noodle strings are made from a dough prepared by kneading raw noodle flour, 0.3-0.6 weight by part of sodium carbonate and/or potassium carbonate based on 100 weight by part of the raw noodle flour and edible acid substance, pH of the dough being set to 7.5-8.5, the sodium carbonate and/or potassium carbonate being added to the raw noodle flour in a form of an aqueous solution thereof, the aqueous solution further containing the edible acid substance and
    the fried noodles comprise 0.23-0.49 weight by percent of sodium carbonate and/or potassium carbonate based on weight of noodle bricks and do not have any scorching damage.

6. Instant-prepared cup noodles comprising:
    a container; and
    the instant-prepared fried noodle according to claim 5 contained in the container.

7. The method according to claim 2, wherein said noodle strings in step (E) are fried in oil of 130° C.-160° C. for 120-240 seconds so that water content in the noodle strings is reduced to 5% or less.

8. Instant-prepared cup noodles, comprising:
    a container; and
    the instant-prepared fried noodles produced according to claim 2 and contained in the container.

9. Instant-prepared cup noodles, comprising:
    a container; and
    the instant-prepared fried noodles produced according to claim 3 and contained in the container.

10. A method for reducing amount of fat and oil in instant-prepared fried noodles, the method comprising steps of:
    (A) adjusting pH of dough to 7.5-8.5 by adding, to raw noodle flour, edible acid substance and 0.3-0.6 weight by part of sodium carbonate and/or potassium carbonate based on 100 weight by part of the raw noodle flour;
    (B) producing raw noodle strings by extruding or rolling the dough and cutting the extruded or rolled dough;
    (C) gelatinizing the raw noodle strings by a steaming process;
    (D) dipping the gelatinized noodle strings in a seasoning solution or water in order to transfer the seasoning solution or water into the gelatinized noodle strings; and
    (E) frying the noodle strings that absorbed the seasoning solution or water at 130° C.-160° C.,
    wherein the step (A) includes forming a solution of the sodium carbonate and/or potassium carbonate and adding the solution to the raw noodle flour, and the aqueous solution further contains the edible acid substance.

* * * * *